3,535,174
Patented Oct. 20, 1970

3,535,174
SOLID BIPROPELLANT COMPOSITION CONTAINING A WETTING MIXTURE OF POLYOXYETHYLATED SORBITAN MONOLAURATE AND LECITHIN
Lawrence J. Bornstein, Riverside, Calif., assignor, by mesne assignments, to the United States of America as represented by the Secretary of the Army
No Drawing. Filed Dec. 6, 1967, Ser. No. 688,536
Int. Cl. C06d 5/00
U.S. Cl. 149—19                    9 Claims

ABSTRACT OF THE DISCLOSURE

A novel mixture of wetting agents for use in bipropellant compositions to improve the processability thereof, the mixture containing equal parts, by weight, of polyoxyethylated sorbitan monolaurate and lecithin.

BACKGROUND OF THE INVENTION

This invention relates to an improved wetting agent for use in bipropellant compositions, and particularly to a novel mixture of wetting agents.

In the past, bipropellant composition without wetting agents or with conventional wetting agents would become subjected to embrittlement and would have less than desirable processing characteristics. In particular, the oxidizer in the bipropellant composition would agglomerate into lumps rather than remain as individual oxidizer particles. These lumps of oxidizer in the biopropellant composition would cause poor processing, castability and curing characteristics, as well as the possibility of embrittlement within the bipropellant composition.

Accordingly, it is the principal object of this invention to provide an improved wetting agent for use in biopropellant compositions.

It is a particular object of this invention to provide such a wetting agent whereby the oxidizer particles in the bipropellant composition do not agglomerate into lumps.

SUMMARY OF THE INVENTION

A mixture of equal parts by weight of Tween 21 and lecithin is an especially desirable wetting agent for use in composite biopropellant compositions containing an oxidizer and a binder.

A mixture of equal parts by weight of Tween 20 and lecithin is an especially desirable wetting agent for use in double-base bipropellant compositions containing an oxidizer and a binder.

DESCRIPTION OF THE PREFERRED EMBODIMENT

A mixture of equal parts by weight of Tween 21 and lecithin improves the processing, castability, and curing characteristics of bipropellant compositions by acting as a wetting agent on the ingredients within the mix. The wetting agents act with the propellant ingredients so as to permit the fuel to become more closely attached to each oxidizer particle. The use of only one of these two agents is not effective where as a combination of the two agents (in equal parts by weight) considerably improves the embrittlement and processing characteristics of the bipropellant composition. If only Tween 21 is used as a wetting agent, the embrittlement characteristics of the bipropellant composition are improved. However, the castability and processing characteristics of the bipropellant composition are poorer when Tween 21 is used exclusively therein rather than a mixture of Tween 21 and lecithin. If only lecithin is used as a wetting agent, the castability and processing characteristics of the bipropellant composition are improved, e.g., wettability is increased and viscosity is decreased. However, poor curing and poor aging of the bipropellant results when lecithin is used exclusively therein. Without this novel combination of wetting agents, the oxidizer in the bipropellant composition will agglomerate into lumps rather than remain as individual oxidizer particles.

No other agent, combination of agents, or other means has been found to accomplish the same effect and improve the properties of the bipropellant composition. The lecithin and Tween 21 should each be preferably present in the propellant composition in an amount of about 0.1 percent by weight.

A typical oxidizer in the bipropellant composition is ammonium perchlorate, and a typical binder in the bipropellant composition is polybutadiene acrylic acid cured with methylaziridinyl phosphine oxide. If desired, a supplementary fuel such as aluminum powder may be incorporated in the propellant composition.

A mixture, according to this invention, of Tween 21 and lecithin is generally useful in composite bipropellants such as those of the rubber-base type (e.g., polybutadiene and polysulfides). The solids (oxidizer and supplementary fuel) content of the bipropellant composition is normally about 84–88% by weight. The binder content is normally about 12–16% by weight. A typical propellant composition of this invention is as follows:

| Ingredient: | Wt. percent |
|---|---|
| Ammonium | 15 |
| Ammonium perchlorate | 69.8 |
| Polybutadiene acrylic acid | 15 |
| Tween 21 | 0.1 |
| Lecithin | 0.1 |

In double-base bipropellants such as nitrocellulose-base types, a mixture of Tween 20 and lecithin (in equal parts by weight) is preferred over a mixture of Tween 21 and lecithin.

Lecithin is defined herein to mean any of the lecithin compounds (or mixtures thereof) of various fatty acid components. The fatty acid component may be oleic, palmitic, stearic, etc.

Tween 21 is a tradename of the Chemical Division of Atlas Chemical Industries, Inc., for a long chain carboxylic acid ester of a polyoxyethylated sorbitan. Specifically, it refers to polyoxyethylated sorbitan monolaurate. The viscosity thereof is about 450 centipoises at 25° C.

Tween 20 is the same polymer but of a different viscosity. The viscosity thereof is about 350 to about 400 centipoises at 25° C.

Various other modifications and variations of this invention will occur to those skilled in the art in the light of the above teachings, which modifications and variations are within the spirit and scope of this invention.

I claim:

1. A solid bipropellant composition comprising an inorganic oxidizer salt, a binder fuel selected from organic resins and nitrocellulose-base type compounds, and a minor amount of a mixture in approximately equal amounts by weight of lecithin and a polyoxyethylene sorbitan monolaurate.

2. The composition of claim 1 wherein said equal amounts are each approximately 0.1% by weight of the bipropellant composition.

3. The composition of claim 2 wherein said bipropellant is of the composite type, and wherein said polyoxyethylene sorbitan monolaurate has a viscosity of about 450 centipoises at 25° C.

4. The composition of claim 3 wherein said inorganic oxidizer salt is ammonium perchlorate.

5. The composition of claim 4 wherein said binder fuel is a polybutadiene.

6. The composition of claim 2 wherein said bipropellant is of the double-base type, and wherein said polyoxyethylene sorbitan monolaurate has a viscosity of about 350 to about 400 centipoises at 25° C.

7. The composition of claim 6 wherein said inorganic oxidizer salt is ammonium perchlorate.

8. The composition of claim 7 wherein said binder fuel is a nitrocellulose compound.

9. The composition of claim 8 wherein said bipropellant additionally comprises aluminum metal.

References Cited

UNITED STATES PATENTS

| | | | |
|---|---|---|---|
| 2,938,780 | 5/1960 | Proell et al. | 149—19 |
| 2,942,964 | 6/1960 | Burgwald et al. | 149—19 |
| 2,946,671 | 7/1960 | Marti | 149—19 |
| 2,946,672 | 7/1960 | Marti | 149—19 |
| 2,967,098 | 1/1961 | Weil | 149—76 XR |
| 2,970,046 | 1/1961 | Cutforth | 149—19 |
| 2,974,026 | 3/1961 | Batchelder | 149—19 |
| 2,991,167 | 7/1961 | Burton | 149—19 |
| 3,027,283 | 3/1962 | Bice | 149—76 XR |
| 3,109,761 | 11/1963 | Cobb et al. | 149—76 XR |

CARL D. QUARFORTH, Primary Examiner

S. J. LECHERT, JR., Assistant Examiner

U.S. Cl. X.R.

149—20, 38, 42, 44, 76, 98, 100